United States Patent [19]

Ahmed

[11] Patent Number: 5,300,323
[45] Date of Patent: Apr. 5, 1994

[54] REDUCING OR AVOIDING PINHOLE FORMATION IN AUTODEPOSITION ON ZINCIFEROUS SURFACES

[75] Inventor: Bashir M. Ahmed, Utica, Mich.

[73] Assignee: Henkel Corporation, Plymouth Meeting, Pa.

[21] Appl. No.: 964,331

[22] Filed: Oct. 21, 1992

[51] Int. Cl.$^5$ .............................................. B05D 3/00
[52] U.S. Cl. ................................... 427/327; 427/435; 427/443.1
[58] Field of Search ................... 427/443.1, 435, 327, 427/309

[56] References Cited

U.S. PATENT DOCUMENTS

| | | | |
|---|---|---|---|
| 3,592,699 | 7/1971 | Steinbrecher et al. | 148/6.2 |
| 3,617,368 | 11/1971 | Gibbs et al. | 117/161 UT |
| 3,922,451 | 11/1975 | Anschutz et al. | 428/35 |
| 4,093,780 | 6/1978 | LeRoy | 427/435 |
| 4,108,817 | 8/1978 | Lochel, Jr. | 260/29.6 |
| 4,178,400 | 12/1979 | Lochel, Jr. | 427/435 |
| 4,199,624 | 4/1980 | Smith | 427/309 |
| 4,242,379 | 12/1980 | Hall et al. | 427/327 |
| 4,243,704 | 1/1981 | Hall et al. | 427/327 |
| 4,313,861 | 2/1981 | Bassett et al. | 260/29.6 H |
| 4,647,480 | 3/1987 | Ahmed | 427/435 |
| 5,080,937 | 1/1992 | Broadbent | 427/435 |

*Primary Examiner*—Terry J. Owens
*Assistant Examiner*—Benjamin L. Utech
*Attorney, Agent, or Firm*—Ernest G. Szoke; Wayne C. Jaeschke; Norvell E. Wisdom, Jr.

[57] ABSTRACT

Pinhole and blister formation during autodeposition coating of galvanized steel and similar zinciferous surfaces can be greatly reduced by exposing the zinciferous surfaces to a pinhole inhibiting aqueous HF solution containing a suitable additive before using an autodeposition process itself. The most effective additives are boric acid, polyphosphonic acids, and polyethyleneimine.

18 Claims, No Drawings

REDUCING OR AVOIDING PINHOLE FORMATION IN AUTODEPOSITION ON ZINCIFEROUS SURFACES

FIELD OF THE INVENTION

This invention relates to the use of liquid, usually aqueous, solutions or dispersions in which active metal surfaces of inserted objects are coated with an adherent polymer film that increases in thickness the longer the metal object remains in the bath, even though the liquid is stable for a long time against spontaneous precipitation or flocculation of any solid polymer, in the absence of contact with active metal. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods, or a like term. Autodeposition is often contrasted with electrodeposition, which can produce very similar adherent films but requires that metal or other objects to be coated be connected to a source of direct current electricity for coating to occur. No such external electric current is used in autodeposition.

Autodeposition compositions previously known in the art are effective for coating many metals of practical interest, but it has been observed that attempting autodeposition coating of most zinc-rich metal surfaces such as galvanized steel often results in coatings with many small "pinholes" or larger blisters. Such coatings are usually regarded as aesthetically unpleasing and often fail to provide the protection against the environment that is normally wanted from autodeposition coatings. Reducing or eliminating the formation of pinholes or larger blemishes in autodeposited coatings on zinciferous surfaces is a major object of this invention.

DESCRIPTION OF RELATED ART

U.S. Pat. No. 3,592,699 of Jul. 13, 1971 to Steinbrecher et al. is one of the early basic patents on autodeposition. It teaches autodeposition baths generally containing an appropriate polymer latex, an appropriate amount of a soluble oxidizing agent such as hydrogen peroxide or dichromate ion, fluoride ions, and sufficient acid to keep the pH within the range of about 2.5–3.5.

U.S. Pat. No. 4,108,817 of Aug. 22, 1978 and U.S. Pat. No. 4,178,400 of Dec. 11, 1979, both to Lochel and both derived from the same initial application, address the same problem as this invention. They teach the use of corrosion inhibitors as additives to autodeposition baths to avoid hole formation. Aldehydes, ketones, amines, thiols, sulfides, thioureas, silicates, phosphates, carbonates, nitrites, oximes, alkynols, chromates, and dichromates are all taught in general terms as suitable by these references, with propargyl alcohol and certain mixtures of thiourea with products of a Mannich reaction between pine resin amines, acetophenone, acetone, and formaldehyde being taught as especially preferred.

U.S. Pat. No. 4,242,379 of Dec. 30, 1980 to Hall et al. also addressed the same problem as this invention. This Hall reference teaches that inhibitors against corrosion of metals in acids, such as those taught by Lochel as additives to an autodeposition bath, can be used instead as a pretreatment before autodeposition. Advantageously, the inhibitors may be combined with conventional alkaline cleaners in a pretreatment step.

U.S. Pat. No. 4,199,624 of Apr. 22, 1980 to Smith teaches that an acid pretreatment of metal substrates can be effective to prevent coating defects in subsequent autodeposition coating of the treated substrates. Common inorganic acids, especially phosphoric acid, are preferred as the acid constituents of the pretreatment compositions according to this reference.

U.S. Pat. No. 4,243,704 of Jan. 6, 1981 to Hall et al. also addresses the problem of preventing pinholes during autodeposition and teaches that temperature control during the process can be effective for this purpose.

U.S. Pat. No. 5,080,937 of Jan. 14, 1992 to Broadbent teaches the use of cystine, either as a constituent of a pretreatment bath or as an additive to an autodeposition bath, as an inhibitor of pinhole formation during autodeposition.

The disclosures of all of the above mentioned U.S. Patents are hereby incorporated herein by reference in their entirety, except for any parts thereof which are inconsistent with any explicit teaching herein.

DESCRIPTION OF THE INVENTION

Except in the operating examples, or where otherwise expressly indicated, all numerical quantities in this description indicating amounts of material or reaction conditions are to be understood as modified by the word "about".

SUMMARY OF THE INVENTION

It has now been found that pretreatment contact of galvanized steel or like zinciferous surfaces with an acidic aqueous solution, preferably a hydrofluoric acid solution, that contains as an additive one or more of certain specific chemical compounds as described in detail below is exceptionally effective in reducing formation of pinholes or similar defects in subsequent autodeposition.

A number of suitable additives according to this invention are shown in the Tables below. Preferred additives include boric acid, polyethyleneimine, 1-hydroxyethylidene-1,1-diphosphonic acid, diethylenetriaminepenta(methylenephosphonic acid), aminotri(methylenephosphonic acid), 2-thiophene carboxylic acid, 2-aminobenzoic acid, 3-aminobenzoic acid, poly(vinylpyrrolidone), potassium acetylacetonate, and acetohydroximic acid. In general, additives which result in the fewest pinholes are most preferred; to some extent, the preference depends on the particular chemical type of autodeposition bath to be used after the pin-hole reducing treatment according to the invention, as shown in the Tables herein.

In its simplest embodiment, a process according to this invention comprises three steps: (i) contacting a zinciferous surfaced object with a pinhole inhibiting aqueous liquid composition comprising, preferably consisting essentially of, or more preferably consisting of, water, an acidic component, preferably hydrofluoric acid, and a suitable additive at a suitable temperature for a sufficient time to result in fewer pinholes in a subsequently autodeposited coating, this step being denoted briefly as "pinhole inhibiting treatment" or "PIT" and the composition used being sometimes briefly denoted hereinafter as "PITC"; (ii) removing the zinciferous surfaced object from contact with the pinhole inhibiting treatment composition; and (iii) applying an autodeposited coating on the surface treated with the PITC in step (i). Preferably, a process according to this invention also includes a reactive alkaline rinse of the wet, although drained, uncured coating formed in the autodeposition bath with aqueous NH$_4$OH having a pH value between 7 and 11, preferably between 7.5 and 10, more preferably between 8.2 and 9.0, and optionally containing bicarbonate and/or organic acid anions.

In the early course of the work which led to this invention, it was believed that the pinhole inhibition property would be positively correlated with a corrosion inhibiting effect of the additives. However, as shown further below, it was found that no such correlation is apparent, so that prior art teachings of materials as corrosion inhibitors should not be taken as making the same materials obvious for use as pinhole inhibitors.

Any cleaning of the zinciferous surfaced object that is needed or desired before the autodeposition coating and is known for this purpose in the prior autodeposition art may be utilized in connection with this invention before the pinhole inhibiting treatment instead.

Under certain conditions, it may be advantageous to rinse the pinhole inhibiting treated surface before introducing it into the autodeposition bath, but often such rinsing is not needed, particularly when the autodeposition bath and the PITC both utilize the same acid as their primary sources of acidity.

The autodeposition composition and process themselves and subsequent treatments with other compositions, including simple and/or reactive rinsing, the use of chromium containing or other known advantageous posttreatment compositions, and heating or other processes such as steam treatment to stabilize the initially formed coating film, are generally the same in an extended process according to this invention as in the prior art. Specific preferred conditions are described below.

DETAILED DESCRIPTION OF PREFERRED EMBODIMENTS

The autodeposition bath used for this invention preferably comprises, more preferably consists essentially of, or still more preferably consists of water and:
(A) from 5 to 550, more preferably from 30 to 300, still more preferably from 40 to 120, and most preferably from 40 to 80, g/L of a stably dispersed organic coating resin;
(B) from about 0.4 to about 5, more preferably from 0.5 to 4.0, still more preferably from 1.0 to 3.0, g/L of fluoride ions;
(C) an amount sufficient to provide from about 0.010 to about 0.20, more preferably from 0.011 to 0.09, still more preferably from 0.012 to 0.045, oxidizing equivalents per liter of an oxidizing agent selected from the group consisting of dichromate, hydrogen peroxide, ferric ions, and mixtures thereof; and
(D) a source of hydrogen ions in an amount sufficient to impart to the autodeposition composition a pH in the range from 1.6 to 3.8, more preferably from 1.7 to 3.0, still more preferably from 1.8 to 2.5.

One preferred type of coating resin for use in forming autodeposited coatings in a process according to the present invention comprise internally stabilized vinylidene chloride copolymers or externally stabilized vinylidene chloride copolymers containing in excess of 50% by weight (hereinafter all percentages are to be understood as percentages by weight unless otherwise specified), or more preferably at least 80%, of residues from polymerizing vinylidene chloride. Most preferably, the vinylidene chloride copolymer is crystalline in nature. Exemplary crystalline resins are described in U.S. Pat. Nos. 3,922,451 and 3,617,368, the disclosures of which, except for any part that may be inconsistent with any explicit statement herein, are hereby incorporated herein by reference. Generally, crystalline poly(vinylidene chloride) containing resins comprise a relatively high proportion of residues from vinylidene chloride, for example, at least about 80% by weight thereof.

A second preferred type of resin for use in autodeposition coating in connection with this invention is an acrylic type, particularly copolymers of acrylonitrile. Further details are given in U.S. Pat. No. 4,313,861 of Feb. 2, 1982 to Bassett et al., the disclosure of which, except for any part that may be inconsistent with any explicit statement herein, is hereby incorporated herein by reference.

The concentration of acid in the PITC preferably is in the range from $5 \times 10^{-6}$ to 10 equivalents of acid per liter (i.e., N), or more preferably from $1.0 \times 10^{-3}$ to 1.0N, still more preferably from 0.10 to 0.50N. With the preferred hydrofluoric acid, the preferred concentration is from 0.05 to 20%, more preferably from 0.05 to 5%, still more preferably from 0.05 to 1.0%.

The concentration of pinhole inhibiting additive in the PITC can generally vary over a wide range without affecting the effectiveness of pinhole inhibition very strongly, particularly with the most effective inhibitors. For each particular inhibitor, there is expected to be a "threshold" value below which little or no inhibition will be achieved. In many cases, there also appears to be a value, usually at least two orders of magnitude above the threshold value, above which the pinhole inhibiting effectiveness of a particular inhibitor decreases. Therefore, the technically preferable values of inhibiting additive concentration will depend in detail on the particular inhibitor. In addition, the practically preferable value will depend on economics: If the rinse solution is not recycled, as is usually more convenient, it is obviously preferable from the cost point of view to use as little of the inhibiting additive as will be adequately effective for the purpose.

Very generally, for most of the better inhibitors disclosed herein, effective inhibition is achieved over a concentration range from 0.001 to 60%, more preferably from 0.010 to 10%. As already noted, lower upper limits on the preferred range may arise for economic reasons.

The working PITC's may be conveniently prepared on site where used by diluting concentrates with water, and such concentrates are also within the scope of this invention. Concentrates normally contain from 3 to 20 times the concentrations of acid and inhibiting additive as disclosed above for working compositions.

The temperature of the PITC during use in a process according to this invention preferably is in the range from 5° to 100°, more preferably from 20° to 60°, still more preferably from 25° to 35° C. The time of contact between the PITC and the zinciferous surface being treated is preferably in the range from 1 second to 3 hours, more preferably from 3 second to 5 minutes, still more preferably from 10 to 120, seconds.

The practice of the invention, especially in its preferred embodiments, may be further appreciated from the following non-limiting examples and comparison examples.

GENERAL EXPERIMENTAL PROCEDURE

The substrate used in these examples was electrogalvanized steel sheet having 70 gm/m$^2$ of zinc on each side. Rectangular panels about 7.6×10.1 centimeters were used. Each panel was cleaned in spray and immersion tanks using a conventional silicated alkaline cleaner (an aqueous solution containing 11.2 grams per liter of AUTOPHORETIC TM Cleaner 1007, commercially available from Parker+Amchem Div. of Henkel Corp., Madison Heights, Mich.). The cleaned panels were rinsed with tap water and then with water conventionally deionized by contact with both acid and alkaline form ion exchange resins (hereinafter denoted as "DI water"). The rinsed panels were dried with forced air and weighed. The weighed panel was then immersed in aqueous 1.08% hydrofluoric acid at room temperature (about 25° C.). In most cases the aqueous acid also contained an additive intended for pinhole inhibition; the additives are specified in the tables below. The acid without any inhibitor was used as "Control".

After one minute of immersion time the panel was removed, rinsed with DI water, dried with forced air, and reweighed. The efficiency of corrosion inhibition was calculated for each panel according to the following equation:

$$\% E = \left( \frac{W_c - W_i}{W_c} \right) \times 100,$$

where E is the efficiency of an inhibitor, $W_c$ is the loss in weight in free acid (Control) and $W_i$ is the weight loss in the presence of a given additive.

Each panel was then processed through the rest of the coating cycle shown in Table 1 below. Two different autodeposition compositions were used, each with a different reaction rinse. The first autodeposition bath composition used was a highly preferred type containing commercially available poly{vinylidene chloride} resin, with ingredients other than water in the following proportions and in the following approximate concentration in water:

| Ingredient | Amount (in Grams, 100% Active Ingredients Basis) |
|---|---|
| Vinylidene chloride-acrylonitrile-butyl acrylate copolymer latex | 50.00 |
| Dodecyl diphenyloxide disulfonate surfactant | 0.14 |
| Colloidal carbon black pigment | 1.88 |
| Ferric fluoride | 3.00 |
| Hydrofluoric acid | 1.40 |

Examples of commercially available latexes suitable for use in the composition are include the SERFENE ® latexes available from Morton Chemical, DARAN ® 112 and DARAN ® SL 143 available from W. R. Grace, 76 RES 5517 TM available from Unocal and the HALOFLEX ® latexes such as, for example, HALOFLEX ® 202 available from Imperial Chemicals Industries. Examples of colloidal carbon black pigment dispersions for suitable use in the composition include RAVEN BLACK ® 1035 available from Columbian Chemicals Co., T-2166A available from ABCO Enterprises, Inc., and AQUABLACK ® 255 and AQUABLACK ® 115A available from Borden Chemical Co.

This poly(vinylidene chloride) resin containing type bath was designated "Type V" in the tables below. The bath was used at 5–6% total solids concentration in water, with the percent solids being adjusted to give a specified coating add-on mass per unit area as specified in detail below. The Type V autodeposition bath was followed by contacting the wet coated substrate, after a dwell time of 30 seconds following removal of the wet coated substrate from the autodeposition bath, with a 1% by volume solution of AUTOPHORETIC TM Reaction Rinse TM 2150 in tap water.

TABLE 1

| PROCESSING SEQUENCE AND CONDITIONS | | | |
|---|---|---|---|
| Operation Number and Name | Method of Contact | Time of Contact, Minutes | Temperature |
| 1. Clean | Spray | 1.0 | 63° C. |
| 2. Clean | Dip | 2.0 | 68° C. |
| 3. Rinse | Dip | 1.0 | room |
| 4. Inhibit Pin Holes | Dip | 1.0 | room |
| 5. Rinse | Dip | 1.0 | room |
| 6. Autodeposit Coating | Dip | 2.0 | room |
| 7. Rinse | Dip | 1.0 | room |
| 8. Reaction Rinse | Dip | 1.0 | room |
| 9. Cure | Electric Oven | 25 | 110 or 177° C. |

Notes for Table 1
Details about the cleaners, autodeposition baths, and reaction rinses are given in the main text. All "Rinse" steps shown were with tap water, except that Step 5 was with DI water. Temperatures shown as "room" were 25 ± 5° C.. The cure temperature was 110° for autodeposition bath Type V and 177 for autodeposition bath Type A.

The other autodeposition bath, designated "Type A" below, was a second highly preferred autodepositing bath containing a commercially available acrylic resin, with the following proportions among ingredients other than water and approximate concentration in water:

| Ingredient | Amount (in Grams, 100% Active Ingredients Basis) |
|---|---|
| Acrylic resin latex | 58.00 |
| Dodecyl diphenyloxide disulfonate surfactant | 0.14 |
| TEXANOL TM | 12.20 |
| Colloidal carbon black pigment | 1.88 |
| Ferric fluoride | 3.00 |
| Hydrofluoric acid | 1.40 |
| Deionized water - balance to make one liter of bath. | |

Examples of commercially available latexes for suitable use in this composition include NACRYLIC ® 78-6334 and NACRYLIC ® 78-6408 from National Starch Co.; NEOACRYL ® A-640 from Imperial Chemicals Industries; RHOPLEX ® WL-91 and RHOPLEX ® B-85 from Rohm and Haas Co.; 76 RES 1018 from Unocal. Examples of colloidal carbon black are the same as those listed above. TEXANOL TM is available from Eastman Chemical Products, Inc. and is reported by its supplier to consist substantially of 2,2,4-trimethyl-1,3-pentanediol monoisobutyrate.

The Type A bath was used at 5–7% concentration in water, followed by an 8% by volume solution of AUTOPHORETIC TM Reaction Rinse 1077, with other conditions the same as for coating with the Type V bath as described above.

During use of each type of autodeposition bath, HF (as a 5% aqueous solution) was added as necessary to maintain a reading within the range of 200±50 microamps on a LINEGUARD TM 101 meter, and additional oxidizing agent (hydrogen peroxide solution) was added as necessary to maintain a potential of 350±50 millivolts, measured against a standard hydrogen electrode, on a smooth platinum electrode immersed in the autodeposition bath. The concentration of solids in the autodeposition bath was adjusted within the limits given above so as to result in a dry autodeposited film thickness of 15±3 microns. A dwell time of 30 seconds was allowed between removing the wet coated substrate from the autodeposition bath and the beginning of the Reaction Rinse step. (All products designated by trademark for use in the Reaction Rinse step are commercially available from the Parker+Amchem Div. of Henkel Corp., Madison Heights, Mich., USA.)

After completion of the process cycle shown in Table 1, the pin-holes in an area of about 6.3 square centimeters on the dry coating were counted.

TABLE 2

CORROSION INHIBITOR EFFICIENCY AND PINHOLE INHIBITION EFFECTIVENESS FOR VARIOUS ADDITIVES TO AQUEOUS HYDROFLUORIC ACID SOLUTIONS

| Additive | Concentration in g/L | Loss of Sample Mass per 9.3 Square Decimeters of Area | % $E^1$ | Average Number of Pinholes per 6.4 Square Centimeters of Sample Area for Bath Type: A | V |
|---|---|---|---|---|---|
| Acetohydroximic acid. FW = 75.07 $CH_3CONHOH$ | 0.0038 | 0.0608 | 43 | 4 | >100 |
| | 0.0751 | 0.0672 | 37 | 0 | 5 |
| | 7.5070 | 0.1181 | 11 | 1 | 26 |
| 2-Aminobenzoic acid. FW = 137.14 $H_2NC_6H_4CO_2H$ | 0.0069 | 0.0828 | 22 | 5 | 16 |
| | 0.1372 | 0.0543 | 49 | 5 | 22 |
| | 13.7140 | 0.0450 | 58 | 1 | 21 |
| 3-Aminobenzoic acid. FW = 137.14 $H_2NC_6H_4CO_2H$ | 0.0069 | 0.0768 | 28 | 1 | 9 |
| | 0.1372 | 0.0726 | 32 | 1 | 14 |
| 4-Aminobenzoic acid. FW = 137.14 $H_2NC_6H_4CO_2H$ | 0.0069 | 0.0582 | 45 | 2 | 6 |
| | 0.1372 | 0.0654 | 39 | 6 | 72 |
| Aniline FW = 93.13 $C_6H_5NH_2$ | 0.0047 | 0.0648 | 39 | >100 | >100 |
| | 0.0932 | 0.0671 | 37 | >100 | >100 |
| | 9.3130 | 0.0462 | 57 | 50 | >100 |
| L-Ascorbic Acid FW = 176.12 $C_6H_8O_6$ | 0.0089 | 0.0600 | 44 | >100 | 60 |
| | 0.1762 | 0.0942 | 11 | >100 | >100 |
| | 17.6120 | 0.0790 | 26 | >100 | >100 |
| Benzotriazole FW = 119.13 $C_6H_5N_3$ | 0.0060 | 0.0618 | 42 | >100 | 0 |
| | 0.1192 | 0.0720 | 32 | 8 | >100 |
| Calcium Citrate FW = 570.51 $Ca_3(C_6H_5O_7)_2.4H_2O$ | 0.0130 | 0.0792 | 26 | >100 | >100 |
| Calcium Tartrate FW = 260.21 $CaC_4H_4O_6.4H_2O$ | 0.0130 | 0.0810 | 24 | >100 | >100 |
| Citric Acid FW = 192.12 $C_6H_8O_7$ | 0.0096 | 0.0912 | 14 | >100 | >100 |
| | 0.1921 | 0.0936 | 25 | 60 | 14 |
| | 19.2120 | 0.0918 | 14 | 2 | >100 |
| Diphenic Acid FW = 242.23 $C_{14}H_{10}O_4$ | 0.0121 | 0.0942 | 11 | >100 | 80 |
| | 0.2422 | 0.0468 | 56 | 2 | >100 |
| Morpholine FW = 87.12 $C_4H_9ON$ | 0.0044 | 0.0996 | 6 | 10 | 30 |
| | 0.8172 | 0.0978 | 8 | 80 | >100 |
| | 8.7120 | 0.0792 | 26 | >100 | 33 |
| Oxalic Acid FW = 90.04 $HO_2CCO_2H$ | 0.0045 | 0.108 | 2 | >100 | >100 |
| | 0.0900 | 0.0996 | 6 | >100 | >100 |
| | 9.0040 | $-0.040^2$ | $-^2$ | 20 | 5 |
| Procaine Hydro-Chloride FW = 272.8 $C_{13}H_{21}O_2N_2Cl$ | 0.0137 | 0.1062 | 0 | 50 | 60 |
| | 0.2728 | 0.0936 | 12 | 50 | 80 |
| | 9.0040 | 0.0702 | 34 | >100 | >100 |
| DL-Tartaric Acid FW = 150.09 $C_4H_6O_6$ | 0.0075 | 0.0978 | 8 | >100 | >100 |
| | 0.1500 | 0.1020 | 4 | 6 | >100 |
| | 15.0090 | 0.078 | 8 | >100 | 45 |
| Tannic Acid FW = 1701.24 $C_{76}H_{52}O_{46}$ | 0.0850 | 0.0462 | 57 | >100 | >100 |
| | 1.7013 | 0.0324 | 70 | 80 | >100 |
| | 170.124 | 0.0216 | 79 | 60 | >100 |
| Ammonium Molybdate. FW = 196 $(NH_4)_2MoO_4$ | 0.0098 | 0.0756 | 29 | >100 | 25 |
| | 0.1960 | 0.0864 | 19 | >100 | >100 |
| | 19.6010 | 0.1914 | $-^3$ | 1 | 5 |
| Boric Acid FW = 61.83 $H_3BO_3$ | 0.0031 | 0.0810 | 24 | 0 | 4 |
| | 0.6180 | 0.1002 | 6 | 0 | 2 |
| | 6.180 | 0.0960 | 10 | 1 | 3 |
| L-Cystine FW = 121.16 $C_3H_7O_2NS$ | 0.0061 | 0.0834 | 22 | 1 | 20 |
| | 0.1212 | 0.0948 | 11 | 0 | 15 |
| Dequest TM 2000 FW = 299.02 $N(CH_2PO_3H_2)_3$ | 0.0272 | 0.0825 | 24 | 0 | 6 |
| | 0.5436 | 0.0888 | 17 | 0 | 18 |
| | 52.7642 | 0.1452 | $-^3$ | 0 | 0 |

TABLE 2-continued
CORROSION INHIBITOR EFFICIENCY AND PINHOLE INHIBITION EFFECTIVENESS FOR VARIOUS ADDITIVES TO AQUEOUS HYDROFLUORIC ACID SOLUTIONS

| Additive | Concentration in g/L | Loss of Sample Mass per 9.3 Square Decimeters of Area | % E[1] | Average Number of Pinholes per 6.4 Square Centimeters of Sample Area for Bath Type: A | V |
|---|---|---|---|---|---|
| Dequest TM 2010 | 0.0217 | 0.2736 | 18 | 0 | 15 |
| FW = 299.02 | 0.3433 | 0.0858 | 19 | 0 | 9 |
| C(OH)(CH$_3$)(PO$_3$H$_2$)$_2$ | 34.3380 | 0.1734 | —[3] | 1 | 5 |
| Dequest TM 2060 | 0.0574 | 0.0678 | 36 | 1 | 9 |
| FW = 573.20 CH$_2$PO$_3$H$_2$N(CH$_2$)$_2$N—(CH$_2$PO$_3$H$_2$)$_2$ | 1.1464 | 0.0576 | 46 | 1 | 8 |
| Poly(ethylen-imine) | 0.0028 | 0.0696 | 35 | 1 | 15 |
|  | 0.0275 | 0.0558 | 48 | 0 | 15 |
| FW = 50,000–60,000 | 0.2750 | 0.0588 | 45 | 0 | 40 |
|  | 2.7500 | 0.0510 | 52 | 0 | 80 |
| Poly(vinyl pyrrolidone) | 0.0050 | 0.0594 | 44 | 0 | 75 |
|  | 0.0500 | 0.0324 | 70 | 3 | 20 |
| FW = 10,000 | 0.5000 | 0.0288 | 73 | 0 | 10 |
|  | 10.0000 | 0.0232 | 78 | 0 | 15 |
| Poly(vinyl pyrrolidone) | 0.0012 | 0.6420 | 40 | 75 | 9 |
|  | 0.0120 | 0.0588 | 42 | 1 | 6 |
| FW = 24,000 | 0.1200 | 0.0306 | 71 | >100 | 6 |
|  | 2.0000 | 0.0300 | 72 | 0 | 4 |
| Poly(vinyl pyrrolidone) | 0.0020 | 0.0702 | 34 | 0 | 20 |
|  | 0.0200 | 0.0372 | 65 | 1 | 2 |
| FW = 40,000 | 0.2000 | 0.0234 | 80 | 2 | 8 |
|  | 2.0000 | 0.0288 | 73 | >100 | >100 |
| Potassium acetylacetonate hemihydrate FW = 147.22 | 0.0074 | 0.0708 | 34 | 1 | 27 |
|  | 0.1472 | 0.0708 | 34 | 0 | 10 |
|  | 14.7220 | 0.0450 | 58 | 1 | 16 |
| Sodium Benzoate FW = 144.61 | 0.0072 | 0.0450 | 58 | 1 | 18 |
|  | 0.0145 | 0.1332 | 26 | 0 | 23 |
| 2-Thiophene Carboxylic Acid FW = 128.15 | 0.0064 | 0.0702 | 34 | 0 | 41 |
|  | 0.1282 | 0.0978 | 8 | 1 | 28 |
| Hydrofluoric Acid. FW = 20 "Control" | 10.8 | 0.1062 | 0 | >100 | 70 |

Footnotes for Table 2
[1] This is the % efficiency of the additive as a corrosion inhibitor, as defined in the main text.
[2] This set of conditions caused samples to gain rather than lose weight in the hydrofluoric acid bath.
[3] These additives under these conditions accelerated corrosion rather than inhibiting it; the weight loss was greater than with the Control.

Other Notes for Table 2
The Dequest TM materials shown in the Table are commercially available from Monsanto. # 2000 is aminotri(methylenephosphonic acid); # 2010 is 1-hydroxyethylidene-1,1-diphosphonic acid; and # 2060 is diethylenetriaminepenta(methylenephosphonic acid).

The extent of corrosion inhibition efficiency and pinhole inhibition effectiveness for each additive is shown in Table 2, and the most effective pinhole inhibiting additives are collected in Table 3.

The results in Table 2 show that there is no evident correlation between corrosion inhibiting efficiency and pinhole inhibiting effectiveness for a given additive.

TABLE 3
PREFERRED PINHOLE INHIBITING ADDITIVES ACCORDING TO THIS INVENTION

| Additive | Average number of Pinholes in 6.3 Cm$^2$ With Type A | With Type V |
|---|---|---|
| 2-Thiophene carboxylic acid | 0 | 35 |
| Dequest TM 2000 | 0 | 8 |
| Dequest TM 2010 | 0 | 10 |
| Polyethyleneimine | 0 | 15 |
| Sodium Benzoate | 0 | 21 |
| 3-Aminobenzoic acid | 1 | 12 |
| Boric acid | 1 | 3 |
| Polyvinylpyrrolidone (24,000–40,000 molecular weight) | 16* | 3* |
| Polyinylpyrrolidone (10,000 molecular weight) | 1 | 30 |
| Dequest TM 2060 | 1 | 10 |
| Potassium acetylacetonate | 18 | |
| Acetohydroximic acid | 2 | 44 |
| 2-Aminobenzoic acid | 3 | 44 |

Notes for Table 3
*Within the preferred concentration range. For a description of the Dequest TM materials, please see the notes for Table 2.

The invention claimed is:
1. A process comprising steps of:

(A) contacting a solid zinciferous surface with a liquid pinhole inhibiting treatment composition consisting essentially of:
  (1) water;
  (2) a source of acidity; and
  (3) a pinhole inhibiting effective amount of at least one inhibiting additive selected from the group consisting of 2-, 3-, and 4-aminobenzoic acids, boric acid, polyethyleneimine, 1-hydroxyethylidene-1,1-diphosphonic acid, aminotri(methylenephosphonic acid), diethylenetriaminepenta(methylenephosphonic acid), 2-thiophene carboxylic acid, sodium benzoate, poly(vinylpyrrolidone), potassium acetylacetonate, and acetohydroximic acid;
(B) removing the zinciferous surface from contact with the pinhole inhibiting treatment composition contacted in step (A); and subsequently
(C) autodepositing an organic protective coating on the zinciferous surface from step (B) by contacting the surface with an autodeposition bath including a source of acidity, so as to form an uncured coating on the surface.

2. A process according to claim 1, wherein the source of acidity in both the pinhole inhibiting treatment composition and in the autodeposition bath used in step (C) is predominantly hydrofluoric acid.

3. A process according to claim 2, wherein the organic protective coating formed in step (C) comprises predominantly poly(vinylidene chloride) resins containing at least 80% by weight of residues derived from vinylidene chloride, the concentration of hydrofluoric acid in the pinhole inhibiting treatment composition is in the range from about 0.05 to about 5.0% by weight, and the amount and type of the inhibiting additive are selected from the group consisting of from about 0.003 to about 6.2 g/L of boric acid, from about 0.0012 to about 0.20 g/L of poly(vinyl pyrrolidone) with a molecular weight in the range from about 24,000 to about 40,000, from about 0.027 to about 53 g/L of aminotri(methylene phosphonic acid), from about 0.02 to about 34 g/L of 1-hydroxyethylidene-1,1-diphosphonic acid, and from about 0.057 to about 1.15 g/L of diethylenetriaminepenta (methylenephosphonic acid).

4. A process according to claim 3, wherein the concentration of hydrofluoric acid is in the range from about 0.05 to about 1.0% by weight and the amount and type of the inhibiting additive are selected from the group consisting of from about 0.003 to about 0.62 g/L of boric acid, from about 0.012 to about 0.20 g/L of poly(vinyl pyrrolidone) with a molecular weight in the range from about 24,000 to about 40,000, from about 0.027 to about 0.54 g/L of aminotri(methylene phosphonic acid), from about 0.02 to about 0.34 g/L of 1-hydroxyethylidene-1,1-diphosphonic acid, and from about 0.057 to about 1.15 g/L of diethylenetriaminepenta(methylenephosphonic acid).

5. A process according to claim 4, wherein the amount and type of the inhibiting additive are selected from the group consisting of from about 0.003 to about 0.62 g/L of boric acid, from about 0.012 to about 0.20 g/L of poly(vinyl pyrrolidone) with a molecular weight in the range from about 24,000 to about 40,000, and from about 0.057 to about 1.15 g/L of diethylenetriaminepenta(methylenephosphonic acid).

6. A process according to claim 1, comprising an additional step of rinsing the uncured coating formed in step (C) with an aqueous ammonium hydroxide solution reactive rinse having a pH in the range from about 7 to about 11 and optionally containing anions selected from the group consisting of bicarbonate and the anions of organic acids.

7. A process according to claim 2, wherein the organic protective coating formed in step (C) comprises predominantly copolymers of acrylonitrile, the concentration of hydrofluoric acid in the pinhole inhibiting treatment composition is in the range from about 0.05 to about 5.0% by weight, and the amount and type of the inhibiting additive are selected from the group consisting of from about 0.004 to about 7.5 g/L of acetohydroximic acid, from about 0.007 to about 13.7 g/L of 2-aminobenzoic acid, from about 0.0069 to about 0.14 g/L of 3-aminobenzoic acid, from about 0.0069 to about 13.7 g/L of 4-aminobenzoic acid, from about 0.003 to about 6.2 g/L of boric acid, from about 0.0028 to about 2.75 g/L of polyethyleneimine with a molecular weight in the range from about 50,000 to about 60,000, from about 0.002 to about 10 g/L of poly(vinyl pyrrolidone) with a molecular weight in the range from about 10,000 to about 40,000, from about 0.027 to about 53 g/L of aminotri(methylene phosphonic acid), from about 0.02 to about 34 g/L of 1-hydroxyethylidene-1,1-diphosphonic acid, from about 0.057 to about 1.15 g/L of diethylenetriaminepenta(methylenephosphonic acid), an amount of potassium acetonylacetate stoichiometrically equivalent to from about 0.007 to about 14.7 g/L of potassium acetonylacetate hemihydrate, from about 0.0072 to about 0.0145 g/L of sodium benzoate, and from about 0.0064 to about 0.128 g/L of 2-thiophenecarboxylic acid.

8. A process according to claim 7, wherein the concentration of hydrofluoric acid in the pinhole inhibiting treatment composition is in the range from about 0.010 to about 1.0% by weight, and the amount and type of the inhibiting additive are selected from the group consisting of from about 0.004 to about 0.075 g/L of acetohydroximic acid, from about 0.007 to about 0.14 g/L of 2-aminobenzoic acid, from about 0.0069 to about 0.14 g/L of 3-aminobenzoic acid, from about 0.0069 to about 0.14 g/L of 4-aminobenzoic acid, from about 0.003 to about 0.62 g/L of boric acid, from about 0.0028 to about 0.28 g/L of polyethyleneimine with a molecular weight in the range from about 50,000 to about 60,000, from about 0.002 to about 2.0 g/L of poly(vinyl pyrrolidone) with a molecular weight in the range from about 10,000 to about 40,000, from about 0.027 to about 0.54 g/L of aminotri(methylene phosphonic acid), from about 0.02 to about 0.34 g/L of 1-hydroxyethylidene-1,1-diphosphonic acid, from about 0.057 to about 1.15 g/L of diethylenetriaminepenta(methylenephosphonic acid), an amount of potassium acetonylacetate stoichiometrically equivalent to from about 0.007 to about 0.15 g/L of potassium acetonylacetate hemihydrate, from about 0.0072 to about 0.0145 g/L of sodium benzoate, and from about 0.0064 to about 0.128 g/L of 2-thiophenecarboxylic acid.

9. A process according to claim 8, wherein the amount and type of the inhibiting additive are selected from the group consisting of from about 0.0069 to about 0.14 g/L of 3-aminobenzoic acid, from about 0.0069 to about 0.14 g/L of 4-aminobenzoic acid, from about 0.003 to about 0.62 g/L of boric acid, from about 0.0028 to about 0.28 g/L of polyethyleneimine with a molecular weight in the range from about 50,000 to about 60,000, from about 0.002 to about 2.0 g/L of poly(vinyl pyrrolidone) with a molecular weight in the range from about 10,000 to about 40,000, from about 0.027 to about 0.54 g/L of aminotri(methylene phosphonic acid), from about 0.02 to about 0.34 g/L of 1-hydroxyethylidene-1,1-diphosphonic acid, from about 0.057 to about 1.15 g/L of diethylenetriaminepenta(methylenephosphonic acid), an amount of potassium acetonylacetate stoichiometrically equivalent to from about 0.007 to about 0.15 g/L of potassium acetonylacetate hemihydrate, from about 0.0072 to about 0.0145 g/L of sodium benzoate, and from about 0.0064 to about 0.128 g/L of 2-thiophenecarboxylic acid.

10. A process according to claim 9, wherein the amount and type of the inhibiting additive are selected from the group consisting of from about 0.0028 to about 0.28 g/L of polyethyleneimine with a molecular weight in the range from about 50,000 to about 60,000, from about 0.027 to about 0.54 g/L of aminotri(methylene phosphonic acid), from about 0.02 to about 0.34 g/L of 1-hydroxyethylidene-1,1-diphosphonic acid, from about 0.0072 to about 0.0145 g/L of sodium benzoate, and from about 0.0064 to about 0.128 g/L of 2-thiophenecarboxylic acid.

11. A process according to claim 10, comprising an additional step of rinsing the uncured coating formed in step (C) with an aqueous ammonium hydroxide solution reactive rinse having a pH in the range from about 8.2 to about 9.0 and optionally containing anions selected from the group consisting of bicarbonate and the anions of organic acids.

12. A process according to claim 9, comprising an additional step of rinsing the uncured coating formed in step (C) with an aqueous ammonium hydroxide solution reactive rinse having a pH in the range from about 8.2 to about 9.0 and optionally containing anions selected from the group consisting of bicarbonate and the anions of organic acids.

13. A process according to claim 8, comprising an additional step of rinsing the uncured coating formed in step (C) with an aqueous ammonium hydroxide solution reactive rinse having a pH in the range from about 7.5 to about 10 and optionally containing anions selected from the group consisting of bicarbonate and the anions of organic acids.

14. A process according to claim 7, comprising an additional step of rinsing the uncured coating formed in step (C) with an aqueous ammonium hydroxide solution reactive rinse having a pH in the range from about 7 to about 11 and optionally containing anions selected from the group consisting of bicarbonate and the anions of organic acids.

15. A process according to claim 5, comprising an additional step of rinsing the uncured coating formed in step (C) with an aqueous ammonium hydroxide solution reactive rinse having a pH in the range from about 8.2 to about 9.0 and optionally containing anions selected from the group consisting of bicarbonate and the anions of organic acids.

16. A process according to claim 4, comprising an additional step of rinsing the uncured coating formed in step (C) with an aqueous ammonium hydroxide solution reactive rinse having a pH in the range from about 7.5 to about 10 and optionally containing anions selected from the group consisting of bicarbonate and the anions of organic acids.

17. A process according to claim 3, comprising an additional step of rinsing the uncured coating formed in step (C) with an aqueous ammonium hydroxide solution reactive rinse having a pH in the range from about 7 to about 11 and optionally containing anions selected from the group consisting of bicarbonate and the anions of organic acids.

18. A process according to claim 2, comprising an additional step of rinsing the uncured coating formed in step (C) with an aqueous ammonium hydroxide solution reactive rinse having a pH in the range from about 7 to about 11 and optionally containing anions selected from the group consisting of bicarbonate and the anions of organic acids.

* * * * *